United States Patent
Flament et al.

[11] Patent Number: 6,087,038
[45] Date of Patent: Jul. 11, 2000

[54] DEVICE FOR CONTROLLING THE TEMPERATURE OF A BATTERY OF ELECTROCHEMICAL CELLS

[75] Inventors: Pascal Flament, Bordeaux; Jean Fradin, Fontaine Le Comte; Laurent Souliac, Saint Benoit; Gérard Rigobert, Poitiers, all of France

[73] Assignee: Alcatel, Paris, France

[21] Appl. No.: 09/045,533

[22] Filed: Mar. 23, 1998

[30] Foreign Application Priority Data

Mar. 24, 1997 [FR] France ................................. 97 03537

[51] Int. Cl.[7] .................................................. H01M 10/50
[52] U.S. Cl. .............................................. 429/120; 429/62
[58] Field of Search ................................. 429/50, 62, 120

[56] References Cited

U.S. PATENT DOCUMENTS

| | | | |
|---|---|---|---|
| 4,383,013 | 5/1983 | Bindin et al. | 429/112 |
| 5,141,826 | 8/1992 | Bohm et al. | 429/120 |
| 5,158,841 | 10/1992 | Mennicke et al. | 429/120 |
| 5,510,207 | 4/1996 | Grivel | 429/120 |
| 5,569,552 | 10/1996 | Rao | 429/72 |
| 5,607,787 | 3/1997 | Wedlake et al. | 429/62 |

FOREIGN PATENT DOCUMENTS

| | | |
|---|---|---|
| 0596778A1 | 5/1994 | European Pat. Off. . |
| 0607675A1 | 7/1994 | European Pat. Off. . |
| 4326943A1 | 2/1995 | Germany . |

*Primary Examiner*—Maria Nuzzolillo
*Assistant Examiner*—Mark Ruthkosky
*Attorney, Agent, or Firm*—Sughrue, Mion, Zinn, Macpeak & Seas, PLLC

[57] ABSTRACT

In this device for controlling the temperature of a battery of cylindrically-shaped electrochemical cells placed side by side, heat is conveyed by the flow of a heat-conveying fluid, which flow takes place inside a double wall whose section is in the form of circular arcs interconnected at their ends so that the junction points between the arcs are substantially in alignment. Relief is disposed in a baffle configuration inside the double wall to constrain the fluid to flow parallel to said section, alternately in one direction and then in the opposite direction. The wall is disposed against the battery in such a manner that each of the circular arcs is disposed coaxially against one of the cells.

11 Claims, 5 Drawing Sheets

FIG._2

FIG_3

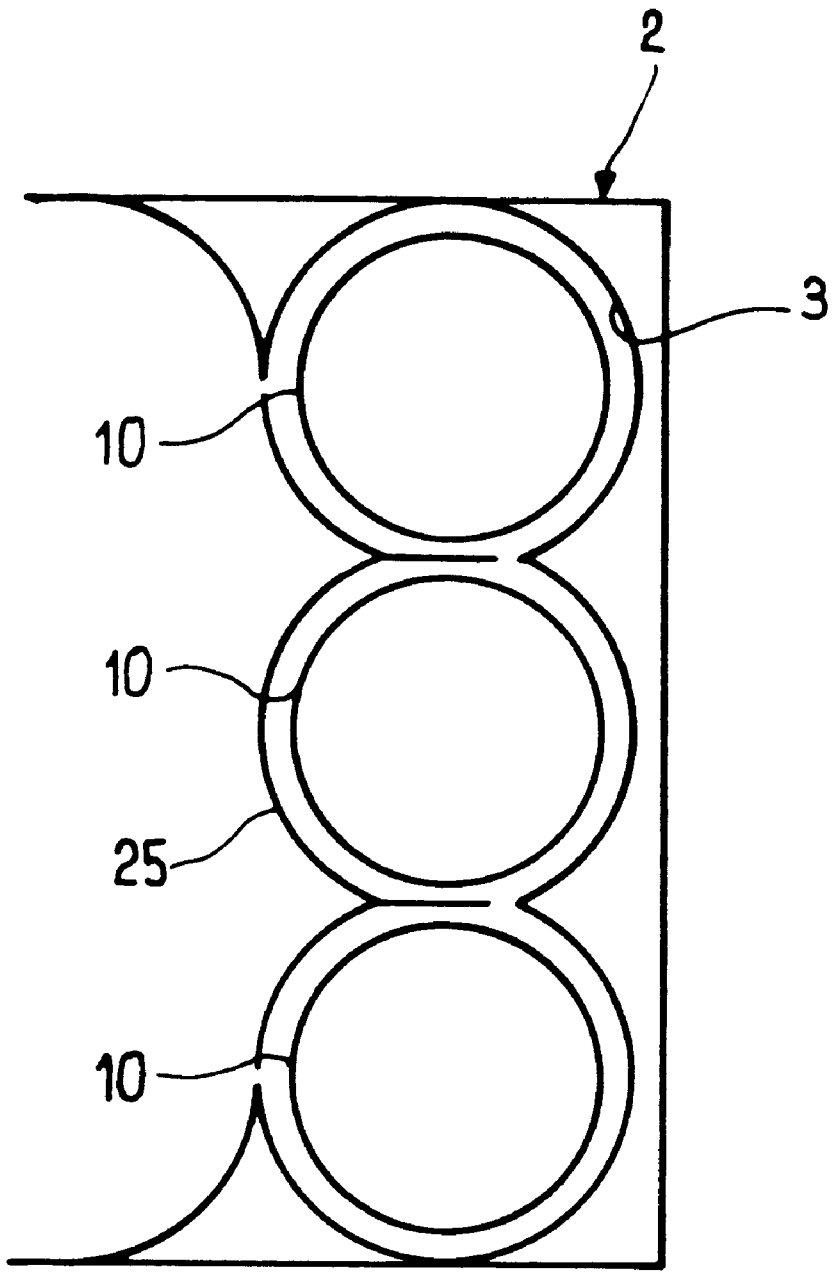
FIG_5

DEVICE FOR CONTROLLING THE TEMPERATURE OF A BATTERY OF ELECTROCHEMICAL CELLS

The invention relates to a device for controlling the temperature of a battery of electrochemical cells of cylindrical shape disposed side by side, each cell comprising spiral-wound electrodes. By way of example, the battery may comprise high capacity (about 44 Ah) lithium-ion type cells. For applications such as an electric car, such cells are often mounted in batteries, each battery comprising a series connection of three couples, each couple comprising two cells connected in parallel, giving a capacity of 2×44 Ah=88 Ah.

BACKGROUND OF THE INVENTION

Spiral-wound cylindrical electrochemical cells may need to be cooled because their temperature rises in use, or on the contrary they may need to be heated when they are required to operate at low temperature.

To this end, it is known to control the temperature of a battery by causing a heat-conveying fluid to flow in the vicinity of the individual cells.

For example, document DE-A-3 416 745 discloses a device for cooling an individual cylindrical storage cell in which a liquid circulates in channels that are spiral-wound around the bottom portion of a cylindrical core whose top portion contains the electrolyte. If applied to a battery of storage cells, that solution would not enable temperature to be distributed uniformly between all of the cells of the battery (particularly concerning corner cells), supposing the cooling coil were to surround the entire battery, or else would lead to excessive bulk if each of the cells in the battery were to be provided with its own cooling coil.

According to document DE-4 102 532, the particular problem of a battery made up of cylindrical storage cells disposed side by side is solved by filling the space between the cells with a porous material in which a heat-conveying fluid flows by capillarity. However, the fluid flow rate is small and the flow path is ill-defined.

OBJECT AND SUMMARY OF THE INVENTION

The object of the invention is to propose a device for managing battery temperature while avoiding the above drawbacks, and on the contrary while simultaneously ensuring good temperature uniformity between the various cells by reducing temperature gradients between them.

According to the invention, this object is achieved by a device for controlling the temperature of a battery of cylindrical electrochemical cells disposed side by side, with heat being conveyed by the flow of a heat-conveying fluid, wherein said flow takes place inside a double wall whose section is in the form of circular arcs interconnected at their ends so that the junction points between said arcs are substantially in alignment, relief being disposed in a baffle configuration within said double wall to constrain said fluid to flow parallel to said section, alternately in one direction and then in the opposite direction, said wall being disposed against said battery in such a manner that each of said circular arcs is disposed coaxially against one of said cells.

Thus, by causing the heat-conveying fluid to flow in a jacket, e.g. made of plastic, which fits over the profile of a plurality of superposed cells, it is ensured that flow takes place in parallel in the vicinity of the cells, thereby obtaining the looked-for uniformity while keeping down overall bulk.

Advantageously, the device of the invention includes inlet and outlet endpieces or nipples for the heat-conveying fluid disposed in parallel with the cells so as to facilitate connection and filling. To keep bulk down, the endpieces remain within the envelope volume of the battery. The length of the cooled zone, and thus the length of the jacket must be equal to more than the length of the active portion (spiral-wound spool) inside each cell; it is therefore shorter than the length of the container of the cell, thereby leaving room for the endpieces.

In the event of the container of the cells being made of a material that is electrically conductive, e.g. a metal, it is necessary to insulate the cells from one another. Under such circumstances, the portion of the surface of the device which comes into contact with the container is made of an electrically insulating material. The container is preferably covered in an electrically insulating material which covers only that portion of the surface of the container which does not come into contact with the device.

In this way, the quantity of insulating material to be used is minimized and the cells are effectively insulated from one another. In addition, heat exchange with the device of the invention is not disturbed by the presence of an intermediate layer.

BRIEF DESCRIPTION OF THE DRAWINGS

Other characteristics and advantages of the invention appear from the following description made with reference to the accompanying drawings, in which:

FIG. 5 is a fragmentary section, analogous to FIG. 3, showing the presence of an insulating film.

MORE DETAILED DESCRIPTION

Figure 1:
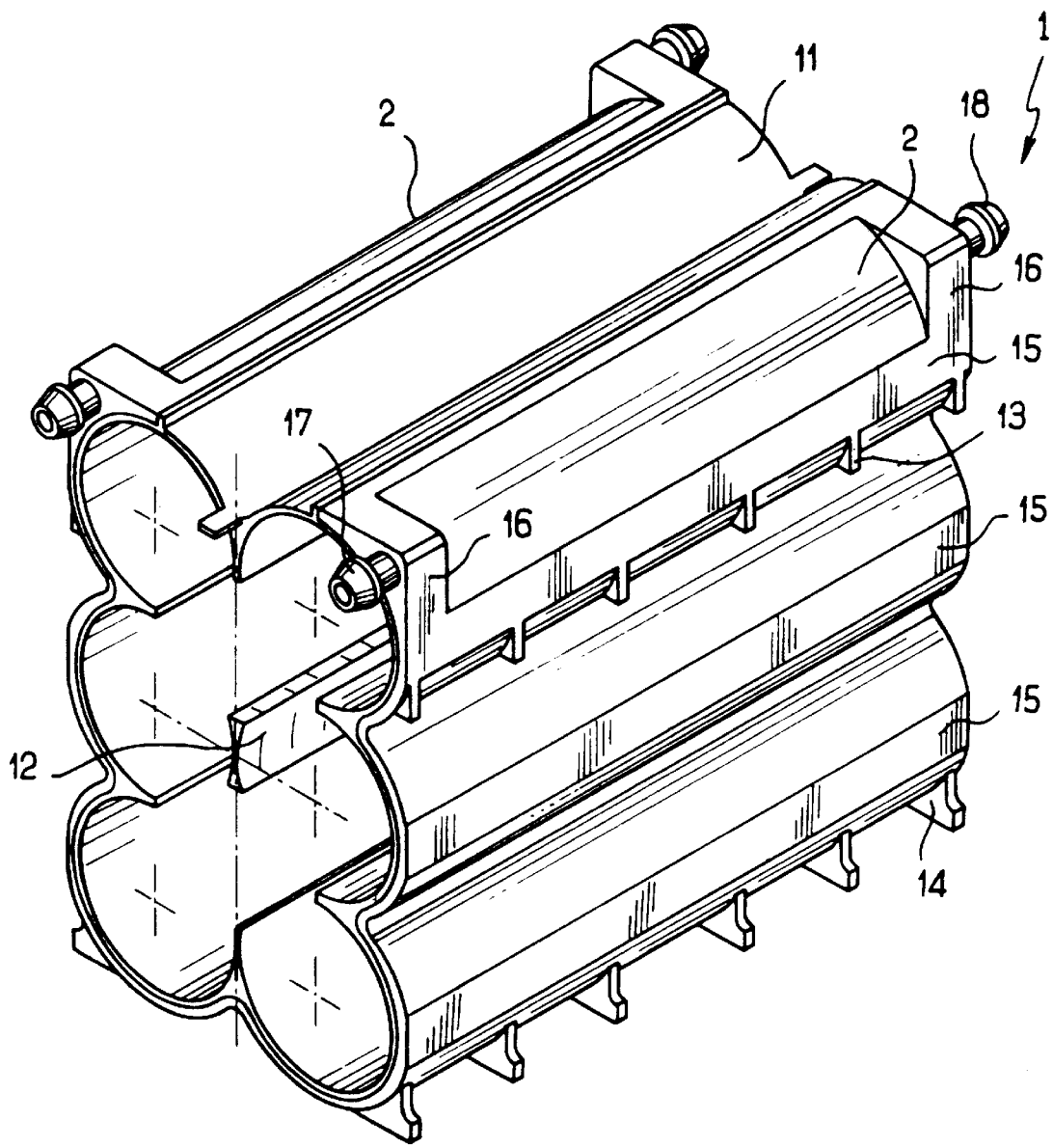
FIG. 1 is a perspective view of a first embodiment of a thermal jacket of the invention.
Figure 2:
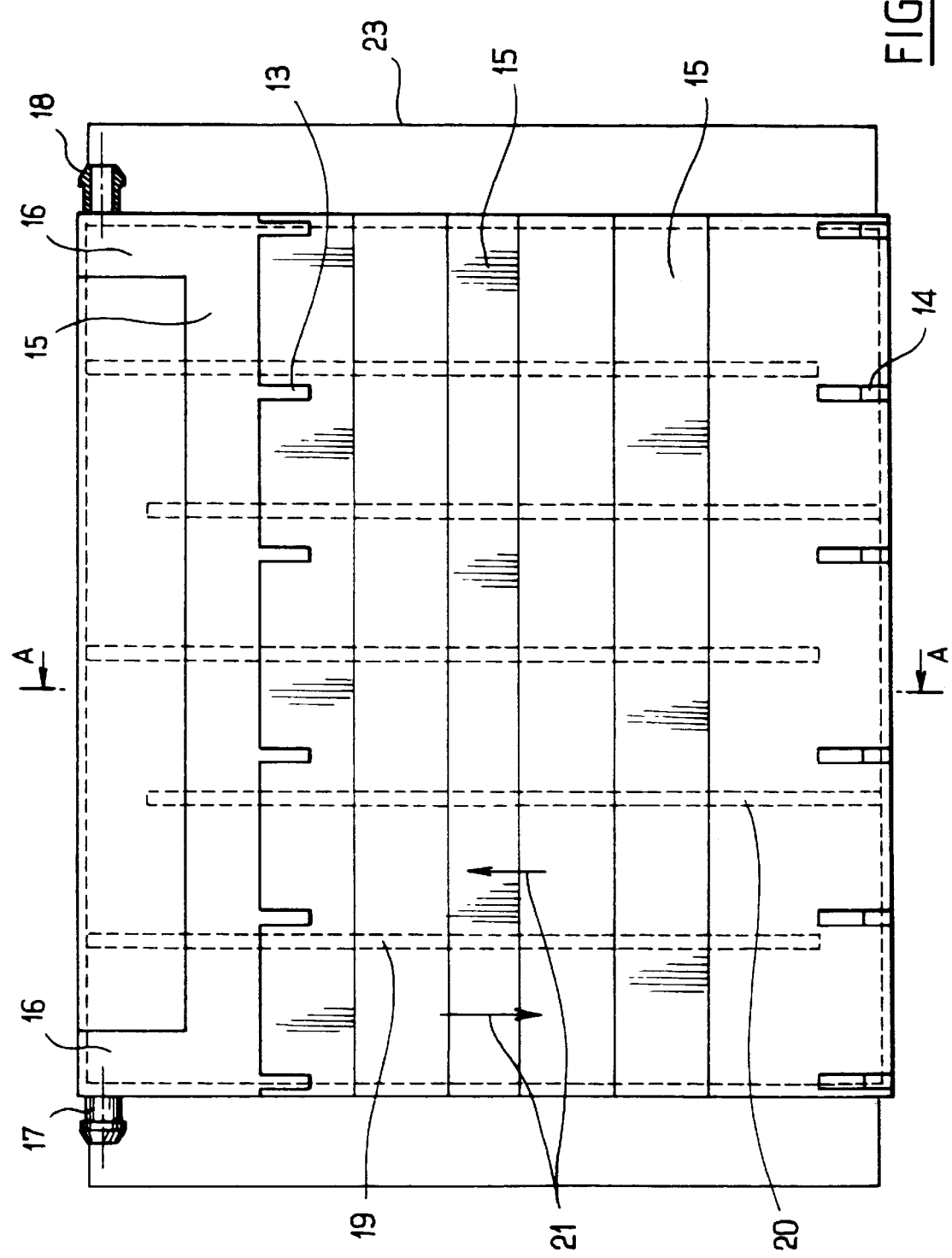
FIG. 2 is a side view of the FIG. 1 jacket.
Figure 3:
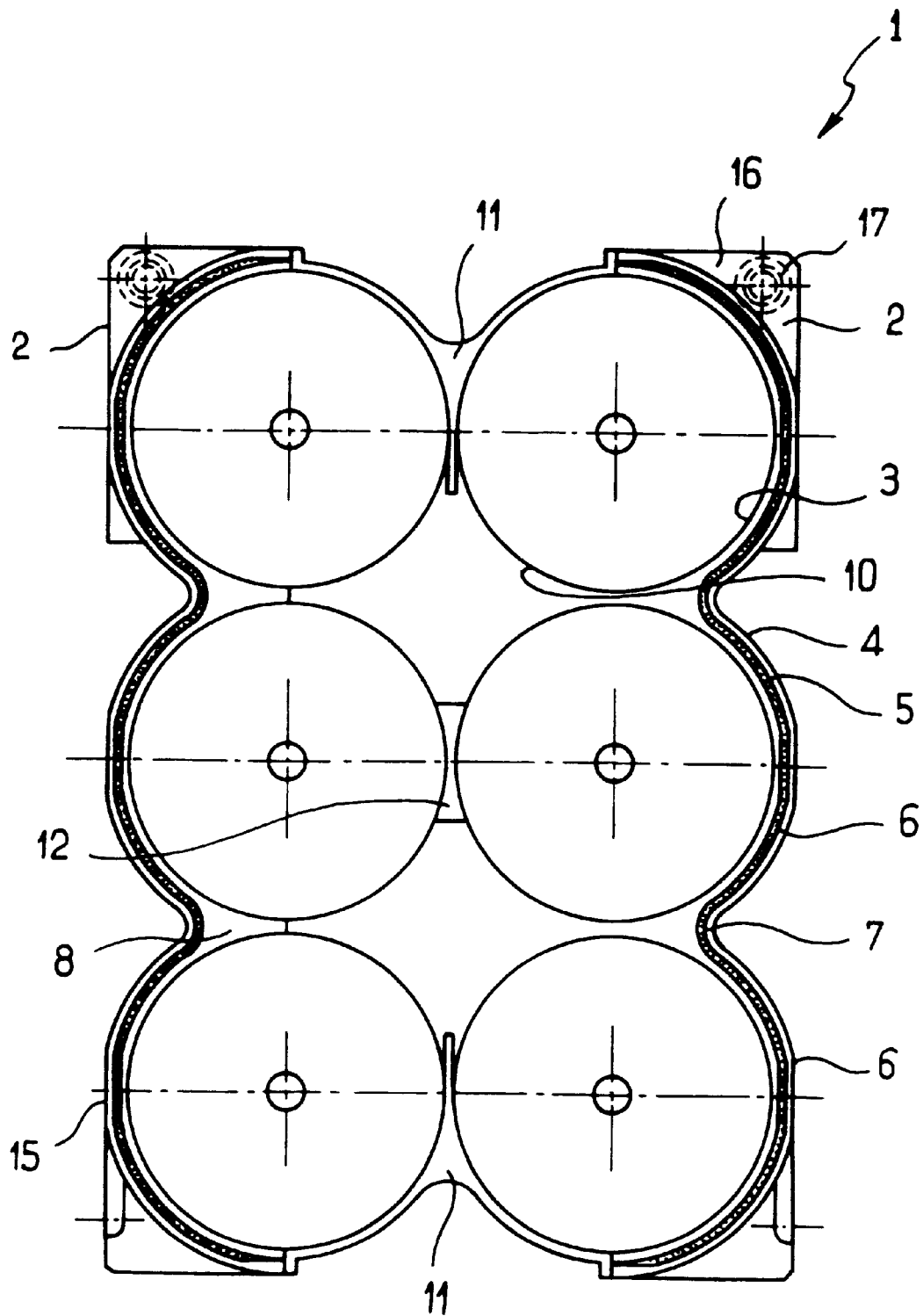
FIG. 3 is a section on AA of FIG. 2.
Figure 4:
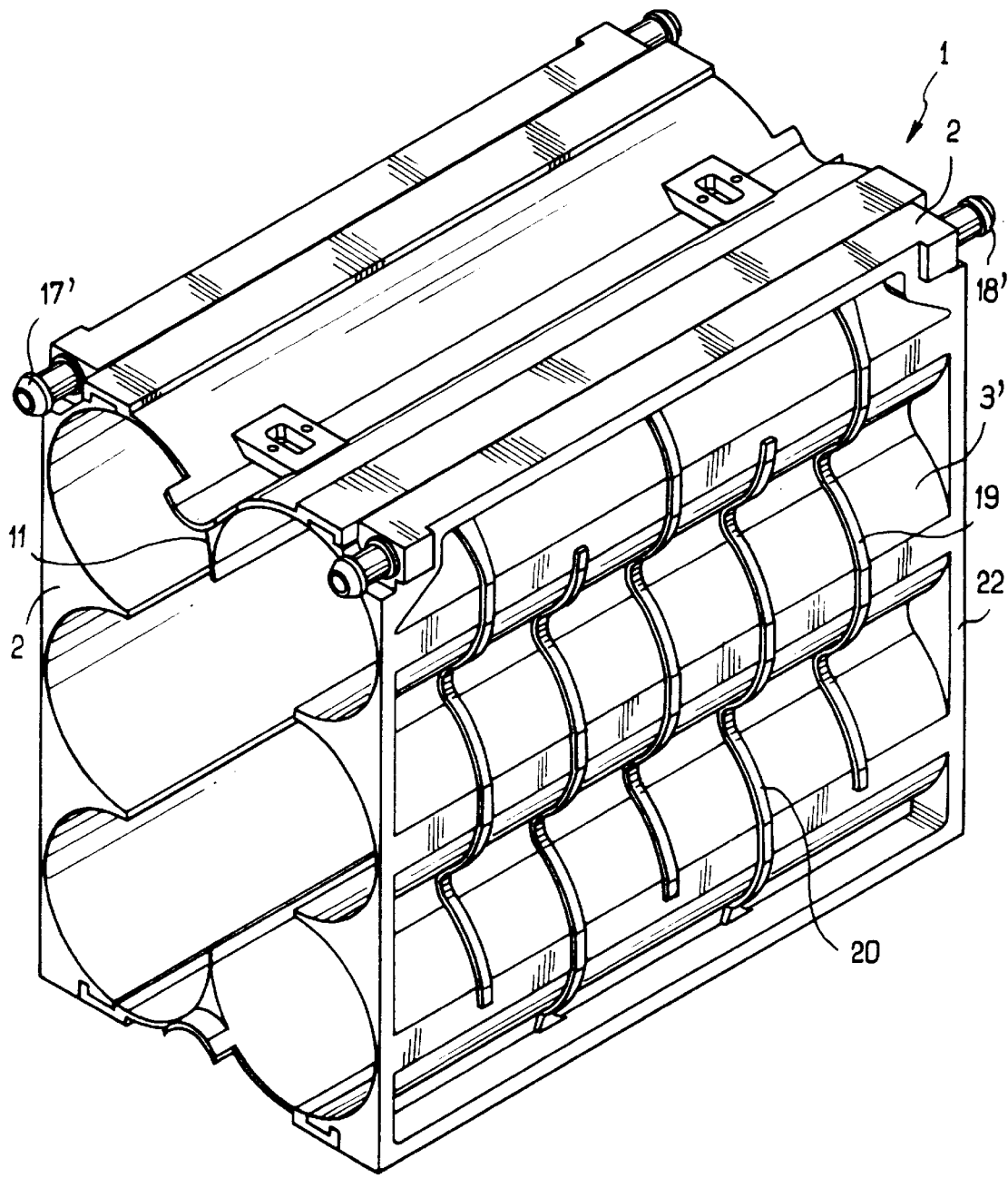
FIG. 4 is a perspective view of a second embodiment of the thermal jacket.

The temperature management device of the invention and shown in the drawings is designed for use with a battery of six cylindrical electrochemical cells disposed in two contiguous columns, each of three superposed contiguous horizontal cells, not shown in FIGS. 1, 2, and 4, but sketched in FIG. 3.

The device is constituted by a double-walled jacket 1 that follows the shape of the cells.

The jacket is made up of two half-jackets 2, each providing temperature control for one vertical column of cells.

Each half-jacket 2 comprises an inner wall 3 matching the superposed cylindrical sectors of the generators 10, and an outer wall 4 of the same shape that is held a short distance away from the inner wall 3 so as to leave a space 5 in which the heat-conveying fluid can flow.

The double wall 3, 4 thus constitutes, in section (FIG. 3), circular arcs 6 that meet at their ends, with their junction points 7 being substantially in alignment in a common vertical plane.

The inner wall 3 includes section members 8 for keeping the cells 10 separated horizontally, while intermediate section members 11 and 12 keep the cells 10 separated vertically between the two half-jackets 2.

From place to place, the outer wall 4 has items in relief 13, 14 in the form of fins, and also flats is that are in alignment in a vertical plane.

At the top longitudinal ends of each half-jacket there is formed a respective lug 16 on which there are disposed a feed endpiece 17 and an exhaust endpiece 18 that extend horizontally, the inner channels thereof communicating through the insides of the lugs with the space 5. The endpieces 17 and 18 remain within the envelope volume of the battery whose longitudinal limits are shown diagrammatically at 23 in FIG. 2.

Internally, the space 5 is subdivided by top and bottom vertical baffles 19 and 20 so as to cause circulation to take place internally along alternating downward and upward paths as shown by arrows 21 (FIG. 2), thereby enabling the cells to be cooled effectively and in as uniform a manner as possible.

The cells are cooled in parallel. The temperature gradient established between the beginning and the end of the flow in the vicinity of the cells is absorbed by the high thermal conductivity of the electrodes in the planes of the couples (axes of the cells).

Having two cooling circuits in parallel keeps headlosses down.

Finally, the heat-conveying fluid both enters and leaves the module from the top, via the horizontal endpieces, thereby keeping down the number of bubbles in the pipes for connection to the fluid supply and making it easier to connect batteries hydraulically in series (two successive batteries having their endpieces face to face).

FIG. 4 shows a variant embodiment for the thermal jackets. The inside wall 3' having baffles made up of ribs 19 and 20 is surrounded by a rim constituting a plane frame 22 on which it is possible to secure a cover (not shown) constituting the outer wall which co-operates with the inner wall 3' to define a flow space for the heat-conveying fluid. In this embodiment, the inlet and outlet endpieces 17' and 18' are formed at the corners of the frame 22.

FIG. 5 shows a variant in which the battery of the invention has containers for its cells 10 that are made of metal. The inner wall 3 of half-jacket 2 is made of plastics material and is electrically insulating, at least over that portion of its surface which comes into contact with the containers of the cells 10. Those portions of the surfaces of the cell containers 10 that are not in contact with the wall 3 of the device have a layer 25 of insulating material deposited thereon of the kind known under the trademark "NOMEX".

What is claimed is:

1. A device for controlling the temperature of a battery of cylindrical electrochemical cells disposed side by side, with heat being conveyed by the flow of a heat-conveying fluid, said device comprising:

a double wall jacket whose section is in the form of circular arcs interconnected at their ends so that the junction points between said arcs are substantially in alignment; and a plurality of baffles within said double wall jacket and configured to constrain said fluid to flow parallel to said section, alternately in one direction and then in the opposite direction, wherein said double wall jacket is disposed against said battery in such a manner that each of said circular arcs is disposed coaxially against one of said cylindrical electrochemical cells.

2. A device according to claim 1, including inlet and outlet endpieces, for heat-conveying fluid, that extend parallel to the cells.

3. A device according to claim 2, in which the endpieces are inside the envelope volume of the battery.

4. A battery of electrochemical cells including the device according to claim 1, in which the container for said cells is made of an electrically conductive material and the portion of the surface of said device which comes into contact with said container is made of an electrically insulating material, an electrically insulating material covering only that portion of the surface of said container that is not in contact with said device.

5. A device according to claim 1, wherein said baffles constrain said fluid to flow along said circular arcs, lengthwise, from one circular arc to another.

6. A device according to claim 1, wherein each of said circular arcs is disposed coaxially against a cylindrical surface of one of said cylindrical electrochemical cells.

7. A device as claimed in claim 1, wherein said double wall jacket includes an inner wall and an outer wall such that said plurality of baffles is contained between said inner wall and said outer wall.

8. A device as claimed in claim 1, wherein each electrochemical cell includes a container having a first length and an active portion within the container, said active portion having a second length which is shorter than said first length, and wherein said double wall jacket has a third length which is greater than or equal to said second length.

9. A device as claimed in claim 8, wherein said third length is less than said first length.

10. A device as claimed in claim 1, wherein said double wall jacket includes two separate cooling circuits, wherein the heat-conveying fluid flows in parallel through the two cooling circuits.

11. A device as claimed in claim 2, wherein said inlet and outlet endpieces are coaxial with one another.

\* \* \* \* \*